Aug. 15, 1933.                R. MANGOLD                 1,922,596
                              VARIABLE COUPLING
                            Filed Dec. 5, 1931
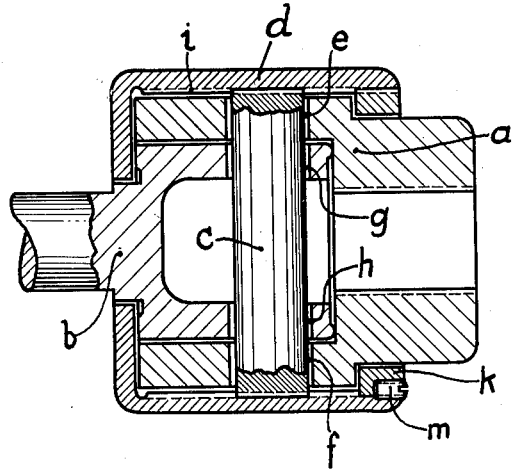
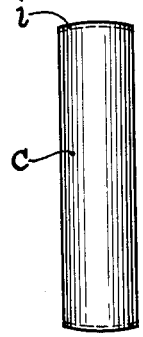
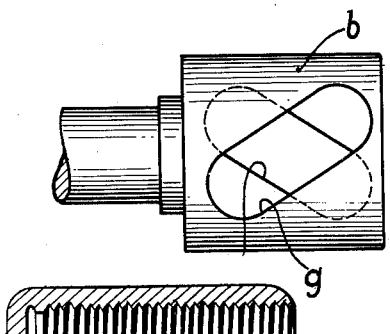
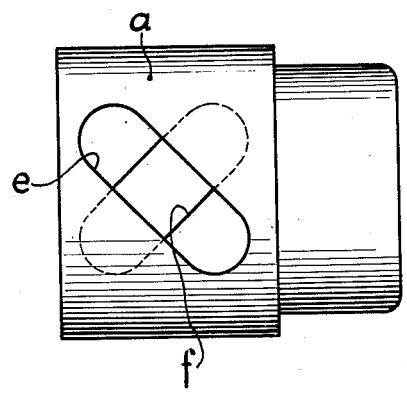
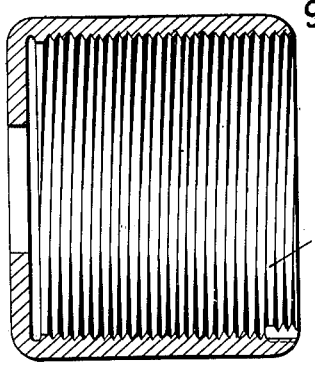

Patented Aug. 15, 1933

1,922,596

UNITED STATES PATENT OFFICE 1,922,596

VARIABLE COUPLING

Rudolf Mangold, Longmeadow, Mass., assignor to Robert Bosch Aktiengesellschaft, Stuttgart, Germany Application December 5, 1931, Serial No. 579,317, and in Germany December 15, 1930

3 Claims. (Cl. 64—90)

This invention relates to a variable coupling such as are suitable for magneto-ignition and the like apparatus of the type in which a pair of shafts are connected each to a sleeve arranged one within the other and having oppositely disposed diagonal slots engaged by a common pin.

In the improved coupling of this invention which is particularly suitable for an adjustment of the coupling by hand, when the shafts are running the pin which transmits the torque or turning moment of the coupling and adjusts it is held in a definite position by a shell or casing surrounding the coupling halves so that by turning the shell in relation to the coupling the pin can be moved in an axial direction.

An example of construction of the invention is illustrated in the drawing, in which:

Figure 1 is a section through an adjustable coupling.

Figure 2 is an elevation of the outer coupling member.

Figure 3 an elevation of the inner coupling member.

Figure 4 an elevation of the coupling pin seen in the axial direction of the coupling.

Figure 5 is a longitudinal sectional view of the shell or casing.

The coupling consists principally of the two coupling halves $a$ and $b$, a pin $c$ inserted in these halves, and a shell or cup-shaped casing $d$, which holds the pin in its position. The coupling part $b$, which, for instance, may be connected to a magneto, is arranged concentrically within the coupling part $a$, which may be connected to a driving motor. The two parts $a$ and $b$ have each two diametrically opposite slots $e$, $f$ and $g$, $h$, respectively in the form of screw-threads and so arranged that the pitch of the threads of the one part is angularly opposed to that of the other part. In the assembled condition of the coupling, the slots which face one another on the inner and outer coupling parts therefore lie transversely to one another. The pin $c$ passes through the slots of the two parts, and is screwed by means of threads $i$ in its ends into the shell or casing $d$ and is held by this latter in its position for the time being. An annular nut $k$ is screwed into the open end of the casing and secured by a screw $m$ against slackening.

The coupling is of special use for slowly running internal combustion engines, such as gas engines, in which an alteration of the time of ignition is necessary between low and high running speeds. The coupling is adjusted in the following manner. The shell or casing $d$, the position of which in relation to the two coupling halves $a$ and $b$ corresponds to the position for the time being of the pin $c$ is turned before starting to such an extent that the pin is screwed into the extreme position towards the driving side. In this way the coupling parts are so adjusted that the device is adjusted for retarded ignition, it being assumed that the shell or casing must be turned in the direction of rotation of the engine. In starting, the pin remains in the said position because the thread of the casing is self-locking and the casing is prevented from having longitudinal displacement, but not from turning with the coupling. If now during the working it is desired to alter the ignition point, the shell or casing must only be held for a moment, so that it performs, in relation to the pin, a relative rotation opposite to the direction of rotation of the motor, and thereby the pin is driven towards the side of the magneto. It will be easily seen that the coupling halves, owing to the transverse position of their slots, are given an angular adjustment in relation to one another through the moving pin $c$.

I declare that what I claim is:

1. A variable coupling comprising a pair of coaxial sleeves having diagonally opposed slots therein, a pin engaged freely through said slots, a rotatable ring embracing said sleeves and connection means between the ends of the said pin and said ring whereby said pin is displaced by turning said ring.

2. A variable coupling comprising a pair of coaxial sleeves having diagonally opposed slots therein, a pin engaged freely through said slots and having threads on its ends, and a ring having internal threading engaging the threads on said pin ends.

3. A variable coupling comprising a pair of coaxial sleeves having diagonally opposed slots therein, a pin engaged freely through said slots and having threads on its ends, and an angularly displaceable shell wholly enclosing said sleeves and having an internal threading engaging the threading on said pin ends.

RUDOLF MANGOLD.